(12) United States Patent
Shiratori

(10) Patent No.: US 6,218,036 B1
(45) Date of Patent: Apr. 17, 2001

(54) SOLID ELECTROLYTE FUEL CELL

(75) Inventor: Akira Shiratori, Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/316,675

(22) Filed: May 21, 1999

(30) Foreign Application Priority Data

Jun. 4, 1998 (JP) ................................. 10-155669

(51) Int. Cl.⁷ ..................... H01M 8/10; H01G 9/032; G01N 27/26
(52) U.S. Cl. ..................... 429/33; 252/62.2; 204/421; 204/429
(58) Field of Search ............... 429/33; 252/62.2; 204/421, 429

(56) References Cited

U.S. PATENT DOCUMENTS 4,347,114 * 8/1982 Kimura et al. .................... 204/426
5,130,210 * 7/1992 Iwasaki et al. .................... 429/33
5,547,556 * 8/1996 Kobayashi et al. ................ 204/426

FOREIGN PATENT DOCUMENTS

| 1471770 | * | 8/1970 | (DE) | 429/33 |
| 034718 | * | 6/1966 | (GB) | 429/33 |
| 1048839 | * | 11/1966 | (GB) | 429/33 |

* cited by examiner

Primary Examiner—Mark F. Huff
Assistant Examiner—Deborah Chacko-Davis
(74) Attorney, Agent, or Firm—Ostrolenk, Faber, Gerb & Soffen, LLP

(57) ABSTRACT

A solid electrolyte fuel cell has an air electrode, a fuel electrode and a solid electrolyte film disposed between the air electrode and the fuel electrode. The solid electrolyte film is formed of yttria-stabilized zirconia in which alumina is added, the concentration of the supplemented alumina at a surface layer section of the solid electrolyte film being larger than that at a center layer section of the solid electrolyte film.

6 Claims, 2 Drawing Sheets

SOLID ELECTROLYTE FUEL CELL

BACKGROUND OF THE INVENTION

1. Field of the Invention

The present invention relates to a solid electrolyte fuel cell.

2. Description of the Related Art

A solid electrolyte fuel cell directly converts chemical potential energy contained in fuel into electric energy by an electrochemical reaction.

FIG. 1 shows a minimum unit of the solid electrolyte fuel cell for generation of electric power. As shown in FIG. 1, the cell 1 comprises a generation section 2, charge collectors 3 and 4 between which the generation section 2 is inserted, and separators 5 and 6 between which the generation section 2 and charge collectors 3 and 4 are inserted. The generation section 2 is a three-layer film and comprises an air electrode 7, a solid electrolyte film 8 and a fuel electrode 9.

Lanthanum manganite ($LaMnO_3$) has been used for the material of the air electrode 7, and yttria-stabilized zirconia (referred to as YSZ hereinafter) has been used for the material of the solid electrolyte film 8. A cermet prepared by mixing, for example, Ni with YSZ has been used for the material of the fuel electrode 9.

Lanthanum manganite ($LaMnO_3$) has also been used for the charge collectors 3 at the air electrode side and Ni has been used for the charge collectors 4 at the fuel electrode side. Lanthanum chromite ($LaCrO_3$) has been used for the material of the separators 5 and 6.

The conventional solid electrolyte film 8 of the solid electrolyte fuel cell 1 having the cell construction described above has a sufficient thickness so that the cell can endure the stress generated during operation or when the temperature is increased or decreased. This causes a problem in that the cell suffers a large potential drop during power generation, thereby resulting in a low generation performance.

In order to solve this problem, it has been proposed that the solid electrolyte film be reinforced by adding alumina ($Al_2O_3$) into the solid electrolyte film while reducing its thickness. It is true that alumina enhances the mechanical strength of the solid electrolyte film, but alumina also increases the potential drop. As a result, the solid electrolyte film has a good mechanical strength but also has a large potential drop, or the solid electrolyte film has a lower potential drop, but also has less mechanical strength.

SUMMARY OF THE INVENTION

The present invention can solve the aforementioned problems associated with the conventional solid-electrolyte fuel cell and provides a solid-electrolyte fuel cell having a sufficient mechanical strength, lower thickness and lower potential drop.

The solid electrolyte fuel cell comprises an air electrode, a fuel electrode and a solid electrolyte film disposed between the air electrode and the fuel electrode. The solid electrolyte film is formed of yttria-stabilized zirconia in which alumina is added, the concentration of the supplemented alumina at the surface layer section of the solid electrolyte film being larger than that at the center layer section of the solid electrolyte film.

According to the present invention, the internal resistance can be reduced by reducing the thickness of the solid electrolyte film without lowering the fracture stress of the solid electrolyte film in the solid electrolyte fuel cell. Accordingly, the generation section is not fractured during operation or during temperature increase and decrease, enabling one to reduce the potential drop in the generation section. The construction allows electric power generation characteristics of the solid-electrolyte fuel cell to be improved besides stabilizing power generation performance with a prolonged life span.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
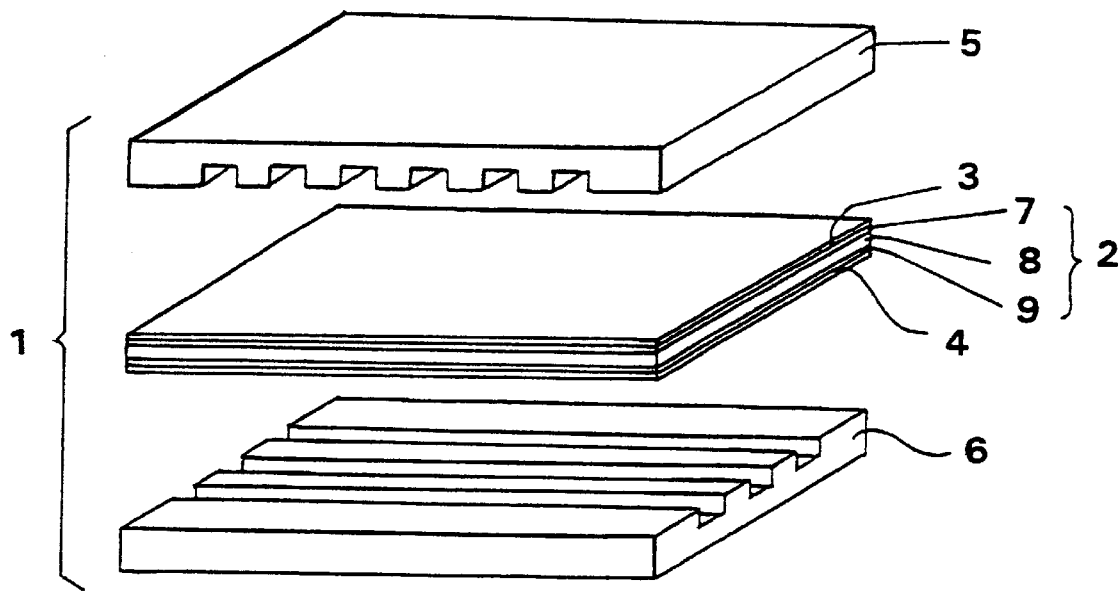
FIG. 1 is an exploded perspective view of a conventional solid electrolyte fuel cell.
Figure 2A:
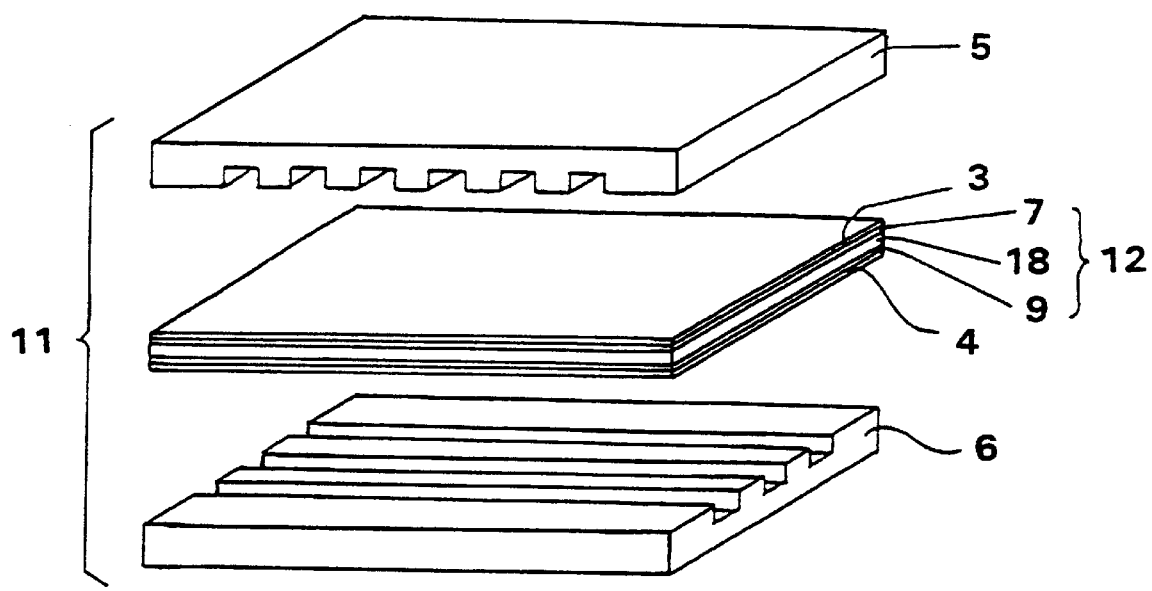
FIG. 2A is an exploded perspective view of a solid electrolyte fuel cell according to an embodiment of the present invention.

As shown in FIG. 2A, a solid electrolyte fuel cell 11 of the present invention comprises a pair of separators 5 and 6, and a generation section 12 interposed between the separators 5 and 6. The solid electrolyte fuel cell 11 further comprises charge collectors 3 and 4 formed on opposing main surfaces of the generation section 12. The generation section 12 has a three-layered structure and comprises an air electrode 7, a fuel electrode 9 and a solid electrolyte film 18 interposed between the air electrode 7 and the fuel electrode 9.

Figure 2B:
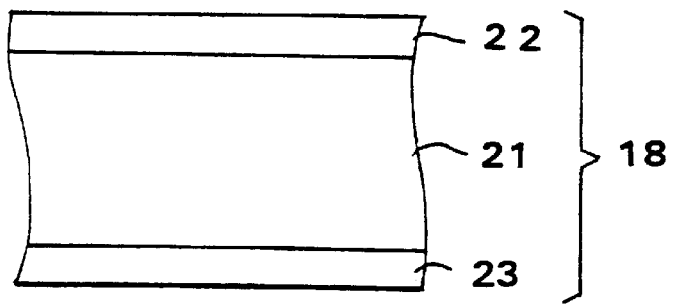
FIG. 2B is a partial cross sectional view of a solid-electrolyte film employed in the solid electrolyte fuel cell shown in FIG. 2A.

As shown in FIG. 2B, the solid electrolyte film 18 comprises a center layer section 21 and a pair of surface layer sections 22 and 23, and the center layer section 21 is interposed between the surface layer sections 22 and 23. The center layer section 21 and the surface layer sections 22 and 23 are made of yttria-stabilized zirconia supplemented with alumina. The amount of alumina is greater in the surface layer sections 22 and 23 than in the center layer section 21.

The construction as described above allows the surface layer sections 22 and 23 of the solid electrolyte film 18 comprising YSZ supplemented with alumina to contain larger amounts of alumina than the center layer section 21 of the film to make the heat expansion coefficient at the surface layer section 22 and 23 smaller than that at the center layer section 21, generating a compressive stress at a temperature below the sintering temperature of the solid electrolyte film 18. Since this compressive stress works against the tensile stress that causes fracture of the ceramic, the solid electrolyte film 18 is further reinforced.

Hereinafter, more specific examples will be explained.

EXAMPLES 1–5

Green sheets for the solid electrolyte films were at first prepared by the doctor blade method using YSZ in which 10%, 12%, 14%, 16%, 18% and 20% by weight of alumina ($Al_2O_3$) was added, respectively.

The YSZ green sheets supplemented with alumina were laminated so that both surface layer sections 22 and 23 of the solid electrolyte film 18 are constituted of a YSZ green sheets with a thickness of 30 μm (the thickness after baking in which 12%, 14%, 16%, 18% and 20% by weight of alumina were added, respectively, and that the center layer section 21 inserted between the surface layer sections 22 and 23 is constituted of a YSZ layer containing 10% by weight of alumina with a thickness of 330, 320, 310, 290 and 290 μm, respectively, thereby obtaining a laminated YSZ green sheets in accordance with Samples 1–5 as shown in Table 1.

mented alumina at the surface portion and central portion of the solid electrolyte film.

Comparative Example 1

The cells were produced by the same method as in the foregoing Examples, except that the sintered body used had no difference in the amount of supplemented alumina (10% by weight) at the surface portion and central portion of the solid electrolyte film and that the thickness of the surface

TABLE 1

| | SOLID ELECTROLYTE FILM | | | | | | |
|---|---|---|---|---|---|---|---|
| | SURFACE LAYER SECTION | | CENTER LAYER SECTION | | SURFACE LAYER SECTION | | TOTAL |
| Sample No. | $Al_2O_3$ (wt %) | THICKNESS (μm) | $Al_2O_3$ (wt %) | THICKNESS (μm) | $Al_2O_3$ (wt %) | THICKNESS (μm) | THICKNESS (μm) |
| Example 1 | 12 | 30 | 10 | 330 | 12 | 30 | 390 |
| Example 2 | 14 | 30 | 10 | 320 | 14 | 30 | 380 |
| Example 3 | 16 | 30 | 10 | 310 | 16 | 30 | 370 |
| Example 4 | 18 | 30 | 10 | 290 | 18 | 30 | 350 |
| Example 5 | 20 | 30 | 10 | 290 | 20 | 30 | 350 |
| Comparative Example 1 | 10 | 30 | 10 | 340 | 10 | 30 | 400 |
| Comparative Example 2 | 10 | 30 | 10 | 310 | 10 | 30 | 370 |

In the next step, the laminated YSZ green sheets after CIP molding was cut into a given size and sintered to obtain a sintered body of the solid electrolyte film in which the content of alumina is larger at the surface section than at the center section.

A paste of lanthanum manganite ($LaMnO_3$) for use in the air electrode and a paste of a mixed powder of NiO and YSZ (cermet) for use in the fuel electrode were screen printed on both main surfaces of the sintered body of the solid electrolyte. The pastes on the sintered body were baked to form a voltaic member comprising three layer films of the air electrode, solid electrolyte film and fuel electrode.

A paste of Ni powder for use in the charge collector at the fuel electrode side and a paste of lanthanum manganite for use in the charge collector at the air electrode side were painted on the fuel electrode side and air electrode side of the three layer films, respectively, with a brush to form the charge collector layers.

Molded bodies of lanthanum chromite ($LaCrO_3$) were produced by press-molding and, after forming a prescribed number of gas flow grooves, the molded bodies were baked into separators. The three layer films formed by coating with the charge collector layers were sandwiched with these separators to construct a cell with a dimension of 150 mm in length, 150 mm in width and 5 mm in thickness.

The center layer sections of the solid electrolyte films of the solid electrolyte fuel cells according to the present invention shown in Examples 1 to 5 are composed of YSZ layers supplemented with 10% by weight of alumina. The surface layer sections of the solid electrolyte films are composed of the YSZ layers containing larger amount of alumina than the central portions. The thickness of all the surface layer sections was adjusted to be 30 μm (the thickness after baking). The thickness of the center layer sections containing 10% by weight of alumina was adjusted so that the solid electrolyte films have the same degree of fracture stress (5.7 to 5.8 N) with each other based on the three point bending strength.

For comparative purposes, cells were prepared using the sintered bodies containing the same amount of suppleportions was adjusted to the same thickness of 30 μm (the thickness after baking) as in the Examples while adjusting the thickness of the central portion to as thick as 340 μm to obtain an overall thickness of the solid electrolyte film of 400 μm.

Comparative Example 2

There were no difference in the amount of supplemented alumina concentration (10% by weight) at the surface portion and central portion of the solid electrolyte and the thickness of the surface portions was adjusted to the same thickness of 30 μm (the thickness after baking) as in Comparative Example 1. The thickness of the central portion of the solid electrolyte film (310 μm) was made, on the other hand, thinner than that in Comparative Example 1, thereby producing a cell using the sintered body with an overall thickness of the solid electrolyte film of 370 μm.

The solid electrolyte fuel cells were constructed using respective cells obtained in Examples 1 to 5 and Comparative Examples 1 and 2. Hydrogen moisturized at 30° C. was fed to the fuel electrode while air was fed to the air electrode. The cell was heated to 1000° C. at a heating rate of 200° C./min and electric power was continuously generated for about 24 hours.

Then, the potential drop (current density; 0.3 $A/cm^2$) at the generation section 12 was measured. Damage of the generation section 12 was visually confirmed when the temperature had been decreased at a rate of 200° C./min after the operation.

In a separate experiment, a test piece of the solid electrolyte film for use in the three point bending test was produced by the same method as used in each of the foregoing examples and the three point bending test was carried out at room temperature. The size of the test piece of the solid electrolyte film was 40 mm in length, 40 mm in width and 0.35 to 0.4 mm in thickness. The three point bending test was carried out with a span of 30 mm at a cross head speed of 0.5 mm/min.

The results of evaluations are listed in Examples 1 to 5 and Comparative Examples 1 and 2.

TABLE 2

| SAMPLE NO. | THREE POINT BENDING STRENGTH (MPa) | FRACTURE STRESS (N) | POTENTIAL DROP (mV) | CRACKS IN THREE LAYER FILMS |
|---|---|---|---|---|
| EXAMPLE 1 | 380 | 5.8 | 109 | NO |
| EXAMPLE 2 | 393 | 5.7 | 107 | NO |
| EXAMPLE 3 | 420 | 5.7 | 106 | NO |
| EXAMPLE 4 | 462 | 5.7 | 101 | NO |
| EXAMPLE 5 | 465 | 5.7 | 103 | NO |
| COMPARATIVE EXAMPLE 1 | 360 | 5.8 | 110 | NO |
| COMPARATIVE EXAMPLE 2 | 360 | 4.7 | 102 | YES |

As shown in TABLE 1 and TABLE 2, YSZ layers containing a larger amount of alumina than at the central portion was provided at the surface portion (at constant thickness of 30 μm after baking) in Examples 1 to 5.

It was shown that the three point bending strength was made stronger as the amount of addition of alumina at the surface portion was increased. Therefore, the thickness of the central portion in which a constant concentration of alumina (10% by weight) had been added was gradually decreased so that the same degree of fracture stress (5.7 to 5.8 N) of the resulting solid electrolyte film could be maintained. Although the overall thickness of the solid electrolyte film was reduced in a manner as described above, the film could ensure the stress generated during operation and when the temperature is increased and decreased since the film had been reinforced by the addition of alumina, exhibiting no cracks in the three layer films after the operation.

Internal resistance was also reduced by making the thickness of the central portion thin along with decreasing the overall thickness of the solid electrolyte film, thereby enabling a reduction potential drop.

Although alumina was added in the solid electrolyte film in Comparative Example 1, there was no difference, in contrast to the examples above, in its concentration (10% by weight) at the surface portion and central portion. Accordingly, the thickness of the central portion is forced to be as thick as 340 μm in order to obtain a prescribed fracture stress (5.7 to 5.8 N), resulting in a overall thickness of the solid electrolyte film of 400 μm. No cracks were generated, however, in the three layer films since the same level of fracture stress (5.8 N) as in the examples was obtained, although the three point bending strength had decreased to 360 MPa. However, the potential drop during power generation (0.3 A/cm$^2$) was as large as 110 mV owing to the large overall thickness (400 μm) of the solid electrolyte film.

In Comparative Example 2, there was also no difference in the concentration of supplemented alumina (10% by weight) at the surface portion and central portion of the solid electrolyte film and the overall thickness was suppressed to 370 μm by reducing the thickness of the central portion to 310 μm. This configuration allowed potential drop to be suppressed to 102 mV, although the fracture stress was lowered to 4.9 N exhibiting cracks in the three layer films after the operation.

As hitherto described, the concentration of the supplemented alumina in the surface portion was made larger than that in the central portion in the solid electrolyte fuel cell according to the present invention, enhancing the mechanical strength besides decreasing the thickness of the central portion, thereby enabling to reduce potential drop by reducing the overall thickness of the solid electrolyte film.

The structure in which the amount of the supplemented alumina in the surface portion of the solid electrolyte film is larger than that in the central portion does not always refer to the structure in which the surface portion and central portion are composed of layers containing the supplemented alumina with two different concentration with each other. For example, the same effect as hitherto described can be obtained by the structure comprising three or more kinds of layers containing different concentrations of alumina with each other, wherein the concentration of the supplemented alumina shows a discrete or gradual increase from the central portion to the surface portion. Likewise, thicknesses other than those particularly illustrated above can be used to achieve the desired mechanical strength/potential drop characteristics.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A solid electrolyte fuel cell comprising:
   an air electrode;
   a fuel electrode; and
   a solid electrolyte film having a pair of opposed surfaces disposed between the air electrode and the fuel electrode,
   wherein the solid electrolyte film is an alumina-containing yttria-stabilized zirconia in which the concentration of the alumina at the opposed surfaces of the solid electrolyte film is larger than the concentration of alumina in the center of the solid electrolyte film between those opposed surfaces.

2. A solid electrolyte fuel cell according to claim 1 wherein the solid electrolyte film comprises three juxtaposed layers and the concentration of alumina in the center member of said layers is less than that in the outermost members of said layers.

3. A solid electrolyte fuel cell according to claim 2 having a separator connected to each electrode and a charge collector connected to each separator.

4. A solid electrolyte fuel cell according to claim 3 in which the air electrode and charge collector associated therewith comprise lanthanum manganite, the fuel electrode comprises Ni-containing yttria-stabilized zirconia, and the separators comprise lanthanum chromite.

5. A solid electrolyte fuel cell according to claim 4 in which the center member of the electrolyte contains about 10% alumina and the outermost members of said layers comprise about 12–20% alumina.

6. A solid electrolyte film having a pair of opposed surfaces and comprising three juxtaposed layers of alumina-containing yttria-stabilized zirconia, wherein the concentration of alumina at said opposed surfaces is larger than the concentration of aluminum in the center of the three layers between said opposed surfaces and wherein the outermost members of said three layers comprise about 12–20% alumina and the layer between said outermost members contains about 10% alumina.

* * * * *